United States Patent
Gurtler

[11] 3,909,930
[45] Oct. 7, 1975

[54] METHOD FOR FABRICATING A LIQUID CRYSTAL DISPLAY DEVICE
[75] Inventor: Richard W. Gurtler, Mesa, Ariz.
[73] Assignee: Motorola Inc., Chicago, Ill.
[22] Filed: May 23, 1972
[21] Appl. No.: 256,028

[52] U.S. Cl............. 29/592; 350/160 LC; 156/145
[51] Int. Cl.² .......................................... G02F 1/16
[58] Field of Search ............ 240/2.25; 350/160 LC; 29/592, 588; 156/48, 145, 17, 3, 6, 13, 15; 96/35.1, 36.2

[56] References Cited
UNITED STATES PATENTS

| | | | |
|---|---|---|---|
| 2,690,966 | 10/1954 | Minsk | 96/35.1 |
| 2,747,997 | 5/1956 | Smith et al. | 96/36.2 |
| 2,810,870 | 10/1957 | Hunter et al. | 29/588 |
| 2,830,899 | 4/1958 | Brown | 96/35.1 |
| 3,036,916 | 5/1962 | Notley | 96/36.2 |
| 3,340,602 | 9/1967 | Hontz | 156/3 |
| 3,404,213 | 10/1968 | Brookover et al. | 29/588 |
| 3,620,879 | 11/1971 | Imamura | 96/36 |
| 3,675,988 | 7/1972 | Soref | 350/160 LC |
| 3,704,052 | 11/1972 | Coleman | 29/592 |
| 3,718,382 | 2/1973 | Wysocki et al. | 350/160 LC |

*Primary Examiner*—C. W. Lanham
*Assistant Examiner*—Dan C. Crane
*Attorney, Agent, or Firm*—Vincent J. Rauner; Henry T. Olsen

[57] ABSTRACT

The method for fabricating a liquid crystal display device includes the steps of providing a pair of insulative, electrode carrying plates; depositing on the surface of one of the plates, whereat the electrodes are located, a layer of photopolymeric material of approximately 0.0005 inches in thickness; masking and light exposing the photopolymeric layer and thereafter developing away with a suitable solvent, a predetermined area of material to provide a cavity in the photopolymeric layer through which the electrodes on the plate are accessible; bonding a second electrode carrying plate to the remaining photopolymeric material to seal the edges of the cavity; filling the cavity with a liquid crystal composition through an aperture provided in the polymeric layer or one of the plates; and thereafter sealing the hole to retain the liquid crystal composition in the cavity.

11 Claims, 7 Drawing Figures

METHOD FOR FABRICATING A LIQUID CRYSTAL DISPLAY DEVICE

BACKGROUND

This invention relates generally to liquid crystal displays and more particularly to a method of fabrication thereof.

Liquid crystal display devices conventionally include a pair of spaced insulative plates or sheets, such as, glass or the like, upon which electrodes are mounted. A thin liquid crystal film is provided between the spaced plates. Upon application of a sufficiently high electric field to the liquid crystal composition, light scattering occurs resulting in a contrast effect permitting visualization of the activated regions. This effect is caused by the interaction of ions (flowing under the influence of the field) with the liquid crystal molecules which are attempting to align in a characteristic way relative to the field. This process is known in the art as Dynamic Scattering. Alternative modes of operation such as, for example, polarization modes, are also known in the art.

In the fabrication of the above described display devices, it is critical that the electrodes be separated by a distance on the order of 0.0005 inches and a seal must be applied between the electrode carrying plates along the outer edges thereof to retain the liquid crystal composition between the plates without contaminating the former.

A technique used presently to seal the edges of the electrode plates is to apply epoxy or the like material thereto. This method, however, still requires that the spacing between the plates and thus the electrodes thereon, be maintained in some fashion. The latter is often accomplished in a separate step by etching one of the plates to form a cavity or by attaching pre-cut pieces of material such as Mylar which serves as a spacing agent. Epoxy is then applied to maintain alignment and accomplish the sealing function.

The latter technique as can be seen requires several steps to provide both the spacing and bonding of the electrode plates. This can be a definite disadvantage in preparing the liquid crystal devices.

SUMMARY

Accordingly, it is an object of the present invention to provide a new and improved method for fabricating liquid crystal display devices which overcomes the drawbacks of the prior art.

It is a more specific object of the present invention to provide a new and improved method for fabricating liquid crystal display devices wherein the spacing of the electrode plates and sealing thereof together is accomplished simultaneously.

It is still another object of the present invention to provide a method of the above described type which is relatively simple to carry out and which produces a liquid crystal display device having accurately spaced electrodes.

Briefly, the method according to the invention for fabricating liquid crystal display devices comprises the steps of providing a pair of planar insulative electrode mounting plates; depositing on the surface of one of the plates on the side thereof including the electrodes, a film of photopolymeric material substantially 0.0005 inches in thickness; selectively masking and light exposing the photopolymer film to remove the latter from a predetermined area substantially at the center of the plate leaving a cavity in the material through which the electrodes on the plate are accessible; bonding the other electrode plate to the polymeric layer by heating under pressure, at approximately 150° centigrade, thereby to seal the edges of the cavity; providing an aperture in the polymeric layer communicating with the cavity through which the liquid composition may be introduced e.g. by capillary filling under vacuum; and sealing the gap thereafter to prevent leakage of the liquid crystal from the cavity and to protect the liquid crystal from the environment.

DETAILED DESCRIPTION

Figure 1:
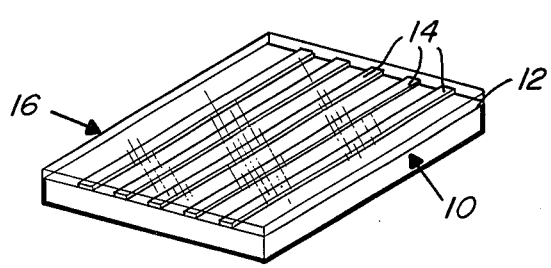
FIGS. 1–5 are perspective views illustrating some of the steps taken in preparing a liquid crystal display device according to the method of the invention.

Referring now to the drawing in greater detail wherein like numerals have been employed throughout the various views to designate similar components, the method of fabricating liquid crystal display devices according to the invention begins with the provision of a plate member 10 of an insulative material, such as, glass or the like (FIG. 1). There is provided on one surface 12 of the plate member 10, a plurality of electrodes 14. The electrodes may be deposited on surface 12 by the well known technique of sputtering. The electrodes may be composed of indium oxide or other suitable material. The electrodes are arranged on the surface 12 of plate member 10 in a predetermined pattern, herein shown as a series of parallel strips. The electrodes can, however, be arranged in other suitable patterns if desired.

On the electrode carrying surface 12 of the glass plate member 10 there is deposited an electrically insulative layer 16 of photopolymeric material. Such materials are comprised commonly from one of the group of polyesters with photosensitizers added. An example of such a photopolymeric material is identified by the trade name RISTON.

The layer of photopolymeric material is of a predetermined thickness, approximately 0.0005 inches. This thickness is required to properly space the electrodes 14 on plate 10 of the liquid crystal display device from those on a second plate to be described hereinafter. The deposition of the photopolymeric material can be accomplished by a laminating technique. Such a technique may be performed by machinery known in the art. Subsequent to laying down the photopolymer layer on the surface of the glass, the plate and polymeric layer are baked in an air atmosphere at approximately 150°C to complete the polymerization.

Figure 2:
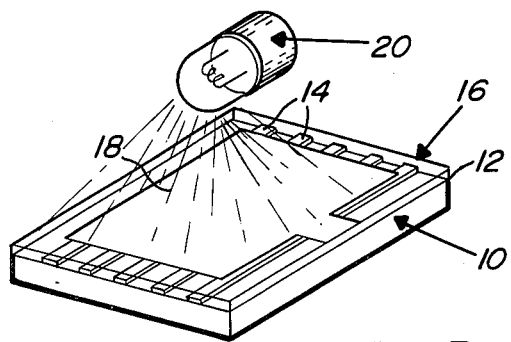

Once the photopolymeric layer is deposited on the electrode carrying surface 12 of the plate member, a mask 18 of a predetermined shape, shown in FIG. 2 as substantially rectangular, is placed over the layer. The layer, which is light sensitive, is then exposed by a light source 20 positioned thereabove. The particular layer 16 of photopolymeric material illustrated in the drawing, is of the "positive" type; i.e., light striking the material causes it to harden so as to resist removal by a suitable developing solution. If the polymeric layer were of the "negative" type the light struck portion of the layer would become developer sensitive and would be made soluble (removable) in the developer solution.

Figure 3:
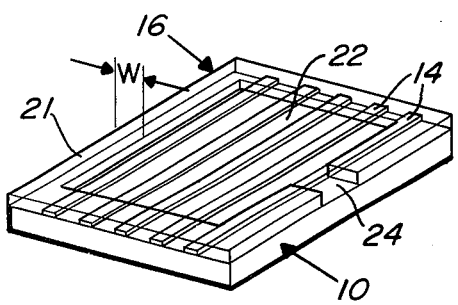

Once the layer 16 is light exposed, the mask 18 is removed and a developer solution, such as, for example, butyl acetate, is applied thereover. The portion of the layer 16 not light exposed is soluble in the developer solution and the nonlight struck portion washes away, leaving a cavity 22 surrounded by a ring 21 of polymeric material, the width $w$ of which is on the order of 0.02–0.06 inches (FIG. 3). In addition, in the case illustrated in the drawing, an opening 24 communicating with the cavity 22 is provided. Subsequent to the washing with the developing solution, the layer 16 is rinsed in xylene and/or water to remove any excess developing solvent therefrom.

As can be seen in FIg. 3 of the drawing, electrodes 14 are accessible through the cavity 22 provided in the photopolymeric layer.

The opening 24 described above, as will be understood hereinafter, is provided to fill the cavity 22 with a liquid crystal composition upon completion of the fabrication of the structure of the display device. If desired, however, the opening need not be provided in the polymeric film. Instead, a smaller hole may be made through one of the plates prior to the deposition of the photopolymeric layer or to the final cleaning and assembly procedures.

Figure 4:
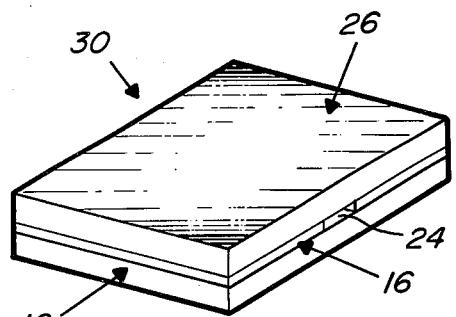
Figure 7:
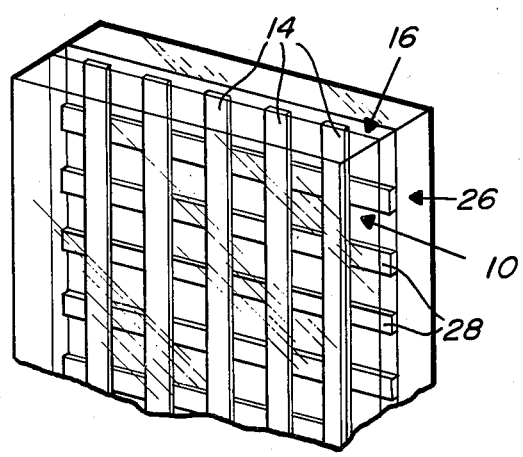
FIG. 7 is a fragmentary perspective view of a liquid crystal display device fabricated in accordance with the method of the present invention.

Once cavity 22 has been provided in the photopolymeric layer 16, a second, insulative electrode carrying plate 26 is placed onto the polymeric layer 16; the electrodes 28 thereof (FIG. 7) being placed into engagement with the layer (FIG. 4). The electrodes formed on plate 26 are likewise arranged in a predetermined pattern, shown in FIG. 7 as a group of parallel strips extending in a direction 90° with respect to the direction of electrodes 14 of plate 10. The two plates 10 and 26 and the layer 16 form a sandwich 30 (FIG. 4).

After placing electrode 26 onto layer 16 as described, the sandwich 30 is heated, under pressure, to approximately 150°C to bond the electrode carrying plate 26 to the polymeric material. The last-mentioned material is heated until it flows so as to seal the edges of the multi-layer structure.

Figure 5:
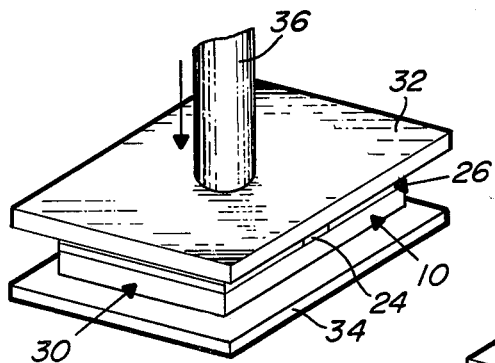

The sandwich 30 is illustrated in FIG. 5 of the drawing as being heated between a pair of pressure plates 32 and 34, the force providing the pressure being applied to top plate 32 in the direction of the arrow at member 32. The latter, it should be understood, is for illustrative purposes only. Any suitable means for applying pressure and heat as described may be used to bond the electrode carrying plates to the photopolymeric layer.

Figure 6:
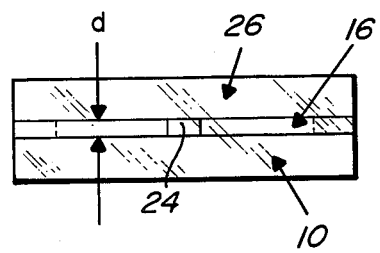
FIG. 6 is a side view of the liquid crystal display device according to the invention as illustrated prior to the introduction thereinto of the liquid crystal composition.

Once the glass or insulative layers 10 and 26 are sufficiently bonded to the polymeric layer 16, the proper spacing $d$ (FIG. 6) between the electrode carrying plates is assured and the structure is sealed at the edges to prevent leakage of liquid crystal material which has yet to be introduced into the cavity 22.

Next, the liquid crystal composition is introduced into cavity 22 via opening 24 in the polymeric layer or alternatively through a hole in one of the plates provided therein prior to cleaning and assembly. The introduction of the liquid crystal may be accomplished by evacuating the cavity in a suitable chamber and then permitting the liquid crystal to flow, by capillary action, into the cavity.

Once the cavity 22 is filled with a suitable liquid crystal composition, the opening 24 is sealed with epoxy, additional polyester material or by ultrasonic means and the liquid crystal display device is completed.

The method of fabricating a liquid crystal display device according to the invention provides a relatively simple but effective technique to insure that the electrodes of the completed liquid crystal display device are properly aligned and spaced from each other. Furthermore, the sealing of the edges of the device to prevent leakage of the liquid crystal composition, is also insured upon bonding the polymeric material to the insulative electrode carrying plates. The technique according to the invention accomplishes both the provision of proper spacing between electrodes and the sealing of the centrally located cavity of the device to prevent leakage of the liquid crystal material therefrom, simultaneously in a relatively simple matter.

I claim:

1. The method of fabricating a liquid crystal display device comprising the steps of:
    providing a first insulative electrode carrying plate;
    depositing a layer of photopolymeric material thereon of a predetermined thickness of the order of 0.0005 inches;
    removing a portion of the photopolymer layer to provide a cavity in the photopolymeric material, thereby exposing the electrodes on the plate;
    joining a second insulative electrode carrying plate to the surface of the photopolymeric layer;
    bonding the plates and layer together with said photopolymeric layer forming a seal about said cavity;
    providing an opening for communication with said cavity;
    filling said cavity, through said opening, with a liquid crystal composition; and
    sealing said opening with a suitable material.

2. The method of fabricating a liquid crystal display device as claimed in claim 1 wherein the step of bonding said plates and photopolymeric layer together comprises heating the plates and layer at a predetermined temperature and under a predetermined pressure, sufficient to cause said photopolymeric material to flow at the edges.

3. The method of fabricating a liquid crystal display device as claimed in claim 1 wherein the removal of said photopolymeric material comprises the steps of:
    masking said photopolymeric layer with an opaque material;
    light exposing said layer through said mask; and
    developing away the unwanted photopolymeric material to provide said cavity.

4. The method of fabricating a liquid crystal display device as claimed in claim 1 wherein the deposition of said layer of photopolymeric material comprises the steps of:
    laminating the photopolymeric material onto the surface of said plate; and
    baking said plate including said laminate to complete the polymerization of said material.

5. The method of fabricating a liquid crystal display device as claimed in claim 1 wherein the removal of said photopolymeric material comprises the steps of:

masking the portion of said layer desired to be removed;

light exposing the photopolymeric layer to harden the portion of said material not masked; and applying a solvent to said photopolymeric layer subsequent to removing the mask to wash away the photopolymeric material not hardened by the exposure to light.

6. The method of fabricating a liquid crystal display device as claimed in claim 1 wherein the filling of said cavity with a liquid crystal composition comprises the steps of:

evacuating the cavity; and permitting liquid crystal to flow, by capillary action, into said cavity.

7. The method of fabricating a liquid crystal display device comprising the steps of:

providing a first insulative plate member carrying an electrode on a first surface thereof;

depositing a layer of photopolymeric material having a predetermined thickness on the order of 0.0005 inches thereto on the surface thereof carrying said electrode;

masking a portion of said photopolymeric layer;

light exposing a predetermined area of said masked photopolymeric layer;

developing said layer to remove the masked portion of said layer, thereby to provide a cavity therein through which said electrode is accessible;

placing a second insulative electrode carrying plate member on said photopolymeric layer with the surface thereof carrying said electrode in contacting engagement therewith to form a three-layer sandwich;

heating the sandwich to a predetermined temperature to bond the electrode carrying plate members to the photopolymeric layer and to seal the edges about said cavity;

providing an opening to communicate with said cavity;

filling said cavity, through said opening, with a liquid crystal composition; and sealing said opening with a suitable material to prevent leakage of said liquid crystal composition.

8. The method of fabricating a liquid crystal display device as claimed in claim 7 wherein the bonding of said plate members to said photopolymeric layer comprises the step of heating the sandwich, under predetermined pressure, to approximately 150°C.

9. The method of fabricating a liquid crystal display device as claimed in claim 7 wherein the development of said photopolymeric layer includes the step of applying a butyl acetate solution to said layer and thereafter rinsing said layer with xylene and water to remove the excess developing solution.

10. The method of fabricating a liquid crystal display device as claimed in claim 7 wherein said opening is provided in one of said plate members prior to the deposition of said layer of photopolymeric material.

11. The method of fabricating a liquid crystal display device as claimed in claim 7 wherein said opening communicating with said cavity is formed upon developing said layer to remove the washed portion thereof.

* * * * *